United States Patent Office 3,770,684
Patented Nov. 6, 1973

3,770,684
LATEX COMPOSITIONS CONTAINING
BODYING AGENTS
William Singer, Teaneck, N.J., and Alfred E. Driscoll,
Bronx, N.Y., assignors to Troy Chemical Corporation,
Newark, N.J.
No Drawing. Filed June 25, 1970, Ser. No. 49,988
Int. Cl. C08f 29/36, 45/24
U.S. Cl. 260—29.7 NR                                8 Claims

ABSTRACT OF THE DISCLOSURE

Compounds of the type R—X— water soluble polymer —X—R' in which the water soluble polyether has a molecular weight between 3000 and 35,000, X is a connecting linkage and R and R' are water insoluble hydrocarbon residues each having a molecular weight of 220 to 400, such compounds being especially adapted for use as leveling agents and viscosity improvers in gloss and semi-gloss latex paints, and latex paint compositions containing same.

---

This invention relates generally to novel additives especially adapted for use in latex paint compositions and more particularly, to the use of relatively minor amounts of selected water soluble polymer derivatives as leveling agents in gloss and semi-gloss latex paint compositions, and to compositions obtained thereby.

The manufacture and use of latex paints having low gloss, frequently known as "flat" paints, which compositions consist of pigments aqueous dispersions of various high molecular weight polymers have been long known. These compositions are well known commercial products and are extensively used for surface coatings both on interiors and exteriors of various structures. The compositions of this type available are generally of the "flat" type, i.e. low gloss.

Although it has been undertaken from time to time to produce aqueous dispersion paints having higher gloss, difficulties have been encountered in preparing such formulations. Despite this, there continues to be demand for aqueous paints of higher gloss characteristics.

Many of the difficulties have occurred when these latex paint compositions were handled in analogous manner to the older solvent based coating compositions. It is well known and practiced in the paint art that with these solvent base paints which are non-aqueous solvent solutions of oxidizing oils and resins, higher gloss can readily and predictably be achieved by using lower pigment to vehicle solids ratios, and by employing relatively finer particle size pigments. The vehicle solids system consisting of nonvolatile oils and resins is present in excess in these compositions and provides the smooth surface coatings typical of enamel or gloss paints.

However, when this same technique, i.e. the lowering of pigment to vehicle solids ratio is used with aqueous latex compositions in attempting to obtain paints of higher gloss, the resulting paint compositions are deficient in both hardness and leveling power, the latter being the ability of a film forming composition to flow and eliminate brush marks, roller marks and other unevenness of the applied surface.

It has been found possible to compensate partially for these deficiencies.

Lack of hardness may be remedied through the addition of a hardening resin, and this does not constitute a great drawback. The lack of flow, or leveling, of the resulting paint film, however, does constitute a serious barrier to wider acceptance of gloss and semi-gloss latex paints.

It is an object of this invention to provide improvements in the leveling characteristics of gloss latex paints.

It is another object of this invention to provide a class of additives especially adapted to improve the leveling power of aqueous dispersion surface coatings having gloss.

It is another object to use certain derivatives of water soluble polymers as additives for improving the leveling of gloss latex paints.

Other and further objects of the invention will become apparent from the detailed description set forth below.

It has now been found that the use of relatively minor amounts of certain selected compounds, structurally related to each other and derived from a linear water soluble polymer effect marked improvements in the leveling of gloss and semi-gloss latex paints. The addition of a small but effective amount of one of these newly discovered leveling agents will frequently result, simultaneously, in a marked increase in the viscosity of the latex paint. It is accordingly remarkable and entirely unexpected that the improvement in leveling occurs despite the viscosity increase. It is entirely contrary to the observations of the paint industry that improvements in leveling should accompany increase in viscosity. Normally, an increase in viscosity decreases paint flow (leveling) because of a decreased mobility of the liquid components.

In this instance the increase in viscosity is not an undesirable effect. Latex paints ordinarily must contain a thickener, usually a polymeric water soluble resin, to increase their viscosity. Such thickeners generally decrease flow of paints, and the viscosity increase observed with the use of the flow additives of this invention permits a decrease in the amount of the regular thickener required. This decrease in thickener use has additionally a further beneficial effect on the flow or leveling characteristics of the paint.

The class of compounds now discovered as being particularly advantageous for use as flow additives in gloss latex paints is made up of compounds having a linear water soluble polymer backbone of appropriate molecular weight falling in a specific useful range whose water solubility is attributable to repeating ether linkages and this backbone being connected to two water insoluble fragments of appropriate molecular weight, located at either end of the polymer molecule.

Such a structure may be designated in a "short-hand" fashion by the general formula R—X— (water soluble polyether) —X—R' where X is the connecting linkage and R and R' are water insoluble hydrocarbon residues.

In the formula above where

X=—O—   an ether linkage
X=—O—C=O an ester linkage
X=—N—C—O—   a urethane linkage
X=—S—   a sulfide linkage
X=—CO—NH$_2$   an amide linkage
X=—NH—   an imino linkage
X=—O—Si—   a siloxane linkage It has been further found that such a compound having the above structure will be effective as a leveling additive when the molecular weight of the water soluble polyether falls between 3,000 and 35,000 preferably between 3,000 and 20,000 and the molecular weight of the water insoluble hydrocarbon fragment(s) "R," falls between 220 and 400.

These compounds can be prepared in a variety of ways. One of the most suitable water soluble polyethers is obtained by the polymerization of ethylene oxide. Copolymerization with propylene oxide or other suitable monomers may be used. This polymerization may be carried on in the presence of a desired and suitable "R" end-group, similar to the way in which for instance some non-ionic detergent compounds are prepared. The second "R" group may then be added as an ester, ether, urethane, or any of the R fragments indicated above. The two "R" groups may either be the same, related, or different.

Alternatively, the water soluble polyether may be prepared separately and the two end groups added simultaneously. Again the "R" end groups may be the same, related or different.

The flow additive for latex paint compositions is best used as a solution in water or a water miscible solvent such as ethylene or propylene glycol, or with suitable water-solvent blends. The addition of the additive to the paint may be made at almost any period of time during paint manufacture, but it has been found most desirable to introduce it during the pigment dispersion step. This ensures proper homogeneity of the resulting paint composition with maximum effects on flow properties and viscosity.

Levels of the additives between 0.1% and 3% based on the total latex weight were found to be useful. However, these amounts are only approximate and the actual useful levels, depending on paint compositions, conditions, and requirements, may fall slightly outside these limits.

Improvement in flow or leveling, usually accompanied by an increase in viscosity, is observed when the appropriate additive selected from those described herein, is dispersed in either latex paints or in unpigmented latices. The beneficial effects are most visible in coating compositions of relatively low pigmentation, or where pigmentation is absent altogether. It is also most apparent, and the additives of the invention find the widest use in gloss or semi-gloss latex paint compositions.

However, it is obvious that the advantages of a leveling agent may be put to use in compositions with higher pigmentation as well.

Samples of the following commercial polyvinyl acetate (PVA) acrylic, and butadiene-styrene latices were obtained from the following identified manufacturers and tested to determine the usefulness of the leveling agents of this invention is a wide range of types of latices. Improvements in leveling characteristics were evident in all cases:

TABLE I

| Latex name | Type | Manufacturer |
|---|---|---|
| Rhoplex AC-22 | Acrylic | Rohm & Haas. |
| Rhoplex AC-61 | do | Do. |
| Rhoplex AC-34 | do | Do. |
| Flexbond 860 | PVA | Airco Corporation. |
| Wallpol 40-124 | PVA | Reichold Chemicals, Inc. |
| 1255 | PVA | National Starch. |
| Parco 37C55 | PVA | Thibault & Walker. |
| Cofar 77 | PVA | Farnow, Inc. |
| U-211 | PVA | U.S. Coatings. |
| #500 Ucar 180 | PVA | Union Carbide. |
| Nelco 270 | PVA | Northeastern Labs. |
| Gelon TS-71 | PVA | Monsanto. |
| 762-K | Butadiene-styrne | Dow Chemical. |
| 300 | do | Do. |

The following examples are presented to be illustrative only of the invention and are intended in no way to restrict it thereto.

EXAMPLES I–XV

In the following examples, one selected latex, Rhoplex AC-34, an acrylic latex was used in evaluating the additive compositions. This use of a single latex is in no way intended or to be considered a limitation on use of a variety of latex compositions since the same effect (benefit or lack of benefit) is shown with other latices. Note Table I. The examples are intended to illustrate the selective range or additive materials used in accord with this invention that are either effective or ineffective as bodying and leveling agents in latex paint compositions.

The following prospective additive compounds have been prepared and tested in accord with the invention and the results are presented following hereafter.

TABLE II (I) Polyethylene glycol, m. wt.=4000, monostearic ester, 10% solution in water.

(II) Polyethylene glycol, m. wt.=4000, distearic ester, 10% solution in water.

(III) Polyethylene glycol, m. wt.=6000, distearic ester, 10% solution in water.

(IV) Polyethylene glycol, m. wt.=6000, distearic ester, 15% solution in propylene glycol:water (1:1).

(V) Polyethylene glycol, m. wt.=6000, dineotridecanoate, (tested as) 10% solution in water.

(VI) Polyethylene glycol, m. wt.=6000, diisostearyl ester, 10% solution in water.

(VII) Polyethylene glycol, m. wt.=6000, dineopentenoate, 10% solution in water.

(VIII) Polyethylene glycol, m. wt.=6000, diester of mixed neoacids of C16–C19, 20% in propylene glycol:water (4:1).

(IX) Polyethylene glycol, m. wt.=6000, dioleic ester, 15% solution in propylene glycol/water (4:1).

(X) Polyethylene glycol, m. wt.=6000, dilauryl ester, 15% solution in propylene glycol:water (4:1).

(XI) Polyethylene glycol, m. wt.=20,000 distearyl ester, 15% solution in propylene glycol:water (4:1).

(XII) Polyethylene glycol, m. wt.=6000 distearyl ether, 20% solution in propylene glycol:water (4:1).

(XIII) Polyethylene glycol, m. wt.=6000, distearyl urethane, 15% solution in propylene glycol (4:1).

(XIV) Distearyl ester of polyethylene glycol, polypropylene glycol block copolymers having the following characteristics:

(1) Pluronic F-68-m. wt.=8,350–80% polyoxyethylene (2) Pluronic F-88-m. wt.=10,800–80% polyoxyethylene (3) Pluronic F-98-m. wt.=13,500–80% polyoxyethylene (4) Pluronic F-108-m. wt.=15,500–80% polyoxyethylene (5) Pluronic F-127-m. wt.=11,500–70% polyoxyethylene Compounds XIV(1)–(5) were prepared in accord with U.S. Pat. No. 2,674,619.

(XV) Polyethylene glycol, m. wt.=6000, $$di(C_{21}H_{43}COOH)$$

ester, 15% solution in propylene glycol:water (4:1).

It is to be noted at the outset that in the above list of compounds No. I is a monoester—only one R group and not two, No. II has R groups and polymer backbone of marginal molecular weights, No. V has R groups of low molecular weight, and No. VII also has R groups of low molecular weight.

Each of the tests was performed as follows: 0.5% of the additive agent (solids) in the form of a solution as indicated in Table III, was added to the latex and thoroughly mixed. Measurements of viscosity were then made through the use of a Stormer Viscosimeter. Leveling observations were made by brushing 8" x 10" sealed paper panels with the treated latex and visually grading the effect. An additive material indicated in Table III as effective showed both an increase in viscosity over the control and an improvement in leveling properties. To provide a numerical value, indicating degree of effectiveness, or ineffectiveness of the various additive compounds tested, the viscosity value in K.U.'s is set forth below.

TABLE III

| Compound identification | Viscosity effectiveness value (K.U.) | Relative visual rating of leveling improvement [1] |
| --- | --- | --- |
| Control—No addition | 55 | 0 |
| I | 55 | 1 |
| II | 60 | 2 |
| III | 136 | 5 |
| IV | 141 | 5 |
| V | 55 | 0 |
| VI | 141 | 5 |
| VII | 53 | 0 |
| VIII | 110 | 4 |
| IX | 141 | 5 |
| X | 70 | 2 |
| XI | 100 | 4 |
| XII | 83 | 3 |
| XIII | 131 | 5 |
| XIV: | | |
| 1 | 68 | 2 |
| 2 | 87 | 3 |
| 3 | 67 | 2 |
| 4 | 99 | 4 |
| 5 | 80 | 3 |
| XV | 100 | 4 |

[1] 0=None; 5=Most.

The above tests were run using 0.5% additive solids, based on the total latex weight. If an additive is active, use of a lesser amount gives a smaller improvement, while use of a larger amount improves the coating properties even further than the results shown by experiment.

Any value above 55 (that of the control composition) is an improvement; values of 60 or higher are considered significant improvements in viscosity and leveling properties and are intended to be included in the invention. It is thus seen that Examples I, V and VII either give no improvement or relatively slight improvement and are consequently not a part of the invention.

EXAMPLE XVI

The compounds listed in Table II were added to the latices indicated in Table I, in the same way as for Examples I-XV. Those compounds found most effective, as indicated in Table III, were most effective for the other latices as well.

What is claimed is:

1. Latex compositions having incorporated therein from about 0.1% to about 3% based on the total latex weight of an additive compound having the structure R—X— (water soluble non-ionic polyether) —X—R' wherein the water soluble non-ionic polyether has a molecular weight from 3,000 to 20,000, R and R' are water insoluble hydrocarbon residues each having a molecular weight from 220 to 400 and X is the linkage connecting them and is selected from the group consisting of an ether linkage, an ester linkage, a urethane linkage, a sulfur linkage, an amide linkage, an imino linkage and a siloxane linkage, whereby the said composition exhibits both increased leveling and improved viscosity characteristics.

2. Compositions according to claim 1 in which the latex is polyvinyl acetate, or a copolymer thereof.

3. Compositions according to claim 1 in which the latex is an acrylic latex, or a copolymer thereof.

4. Compositions according to claim 1 in which the latex is butadiene-styrene latex.

5. Latex coating compositions of claim 1 containing 0.1 to 3.0% based on the latex solids of a dialkyl ester of a polyoxy-alkylene glycol wherein each of the alkyl radicals contains 12 to 22 carbon atoms and the polyethylene glycol has a molecular weight of from 3,000 to 20,000.

6. Latex coating compositions of claim 1 containing 0.1 to 3.0% based on the latex solids of the condensed reaction product of polyoxyethylene glycol having a molecular weight of 6,000 with two radicals selected from the group consisting of alkyl isocyanate, alkyl, and carboxylic acid radicals, each of which two radicals contains from 14 to 22 carbon atoms.

7. Latex coating compositions of claim 1 containing 0.1 to 3.0% based on the latex solids of the diester of a polyoxyethylene glycol having a molecular weight of 6,000 and alkyl carboxy radicals containing 18 carbon atoms each.

8. Latex coating compositions of reduced pigment content having incorporated therein from 0.1 to 3.0% based on the latex solids, of a compound having the formula R—X— (water soluble non-ionic polyether) —X—R' wherein the water soluble non-ionic polyether has a molecular weight of from 3,000 to 20,000 and R and R' are each water insoluble aliphatic residues having a molecular weight of from 220 to 400, and —X— is the linkage connecting them and is selected from the group consisting of an ether linkage, an ester linkage, a urethane linkage, a ulfur linkage, an amide linkage, an imino linkage and a siloxane linkage.

References Cited

UNITED STATES PATENTS

| 2,457,139 | 12/1948 | Fife et al. | 260—410.6 |
| 2,492,955 | 1/1950 | Ballard et al. | 260—410.6 |
| 2,599,803 | 6/1952 | Ballard et al. | 260—410.6 |
| 2,794,825 | 6/1957 | Matter | 260—410.6 |
| 3,002,940 | 10/1961 | Holloway | 260—874 |
| 3,530,154 | 9/1970 | Stein | 260—410.6 |
| 3,404,114 | 10/1968 | Snyder et al. | 260—29.7 H |

OTHER REFERENCES

McCutcheon: Detergents & Emulsifiers, p. 266 (1969).
Schwartz-Perry: "Surface Active Agents," vol. E, chap. VIII, pp. 206-7 (Interscience, 1949).
Martens, Tech of Paints, Varnishes and Lacquers, pp. 516-18 (Reinhold, 1968).

ALLAN LIEBERMAN, Primary Examiner

U.S. Cl. X.R.

260—29.6 RW, 29.7 E